(12) United States Patent
Iio et al.

(10) Patent No.: US 10,256,488 B2
(45) Date of Patent: Apr. 9, 2019

(54) FUEL CELL SYSTEM AND CONTROL METHOD OF THE SAME

(71) Applicant: TOYOTA JIDOSHA KABUSHIKI KAISHA, Toyota-shi, Aichi-ken (JP)

(72) Inventors: Atsuo Iio, Nagoya (JP); Tomio Yamanaka, Nagoya (JP); Kohei Oda, Toyota (JP); Naoki Sugiyama, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 39 days.

(21) Appl. No.: 15/451,585

(22) Filed: Mar. 7, 2017

(65) Prior Publication Data

US 2017/0263960 A1    Sep. 14, 2017

(30) Foreign Application Priority Data

Mar. 10, 2016 (JP) .................................. 2016-046401

(51) Int. Cl.
  *H01M 8/04* (2016.01)
  *H01M 8/04746* (2016.01)
  (Continued)

(52) U.S. Cl.
  CPC ......... *H01M 8/04753* (2013.01); *H01M 8/02* (2013.01); *H01M 8/0494* (2013.01);
  (Continued)

(58) Field of Classification Search
  CPC .. H01M 8/0475; H01M 8/02; H01M 8/04111; H01M 8/04358; H01M 8/04395;
  (Continued)

(56) References Cited

U.S. PATENT DOCUMENTS

2011/0316548 A1* 12/2011 Ghantous ........... G01R 31/3637
                                                                    324/427

FOREIGN PATENT DOCUMENTS

| JP | 2004-327317 | 11/2004 |
|---|---|---|
| JP | 2004-355890 | 12/2004 |
| JP | 2007-257956 | 10/2007 |

* cited by examiner

*Primary Examiner* — Anthony R. Jimenez
(74) *Attorney, Agent, or Firm* — Finnegan, Henderson, Farabow, Garrett & Dunner, LLP

(57) ABSTRACT

A fuel cell system comprises: a fuel cell stack; a turbo compressor configured to supply a cathode gas to the fuel cell stack through a cathode gas supply line; a pressure regulation valve configured to regulate a pressure of the cathode gas; and a controller, wherein the controller is configured to calculate a target rotation speed of the turbo compressor and a target opening position of the pressure regulation valve, based on a target flow rate of the cathode gas and a target pressure of the cathode gas that are determined according to a required power output of the fuel cell stack and to control the turbo compressor and the pressure regulation valve using the calculated target rotation speed and the calculated target opening position, and the controller is configured, upon increase of the required power output, to: (a) determine an acceptable overshoot level of a flow rate of the cathode gas that is to be supplied to the fuel cell stack, the acceptable overshoot level being selected from a plurality of levels based on at least an increased amount of the required power output; and (b) set a time change in opening position of the pressure regulation valve such that an overshoot amount in a change of the flow rate of the cathode gas becomes smaller as the acceptable overshoot level gets lower, and perform control of the pressure regulation valve. This configuration suppresses an excessive overshoot in the flow rate of the cathode gas.

16 Claims, 7 Drawing Sheets

(51) Int. Cl.
*H01M 8/02* (2016.01)
*H01M 8/04111* (2016.01)
*H01M 8/0432* (2016.01)
*H01M 8/04537* (2016.01)
*H01M 8/04992* (2016.01)
*H01M 8/04828* (2016.01)
*H01M 8/0438* (2016.01)

(52) U.S. Cl.
CPC .... *H01M 8/04111* (2013.01); *H01M 8/04358* (2013.01); *H01M 8/04395* (2013.01); *H01M 8/04649* (2013.01); *H01M 8/04992* (2013.01)

(58) Field of Classification Search
CPC ........... H01M 8/04649; H01M 8/0494; H01M 8/04992
USPC ........................................................ 429/446
See application file for complete search history.

FUEL CELL SYSTEM AND CONTROL METHOD OF THE SAME

CROSS-REFERENCE TO RELATED APPLICATIONS

The present application claims priority from Japanese patent application 2016-46401 filed on Mar. 10, 2016, the content of which is hereby incorporated by reference into this application.

BACKGROUND

Field

The present disclosure relates to a fuel cell system and a control method of the same.

Related Art

JP 2004-355890A describes a fuel cell system configured to adjust a supply amount of a cathode gas that is to be supplied to a fuel cell stack, using a rotation speed of a compressor and an opening position of a pressure regulation valve of the cathode gas. In order to suppress an overshoot of the flow rate of the cathode gas, this fuel cell system calculates a response correction amount of the rotation speed of the compressor and adjusts the supply amount of the cathode gas.

When the compressor used is a turbo-type compressor, however, the flow rate significantly changes with a change of the pressure even at a fixed rotation speed. Even the response correction of the rotation speed of the compressor is thus likely to fail in effectively adjusting the flow rate and to provide an excessive overshoot in the flow rate of the cathode gas.

SUMMARY

In order to solve at least part the problems described above, the disclosure may be implemented by aspects described below.

(1) According to one aspect of the disclosure, there is provided a fuel cell system. The fuel cell system comprises; a fuel cell stack; a turbo compressor configured to supply a cathode gas to the fuel cell stack through a cathode gas supply line; a pressure regulation valve configured to regulate a pressure of the cathode gas; and a controller, wherein the controller is configured to calculate a target rotation speed of the turbo compressor and a target opening position of the pressure regulation valve, based on a target flow rate of the cathode gas and a target pressure of the cathode gas that are determined according to a required power output of the fuel cell stack and to control the turbo compressor and the pressure regulation valve using the calculated target rotation speed and the calculated target opening position, and the controller is configured, upon increase of the required power output, to: (a) determine an acceptable overshoot level of a flow rate of the cathode gas that is to be supplied to the fuel cell stack, the acceptable overshoot level being selected from a plurality of levels based on at least an increased amount of the required power output; and (b) set a time change in opening position of the pressure regulation valve such that an overshoot amount in a change of the flow rate of the cathode gas becomes smaller as the acceptable overshoot level gets lower, and perform control of the pressure regulation valve.

In general, in the case of a turbo compressor, the flow rate significantly changes with a change of the pressure even at a fixed rotation speed. When the required power output of the fuel cell stack is increased, the fuel cell system of this aspect (a) determine an acceptable overshoot level of a flow rate of the cathode gas that is to be supplied to the fuel cell stack, the acceptable overshoot level being selected from a plurality of levels based on at least an increased amount of the required power output; and (b) set a time change in opening position of the pressure regulation valve such that an overshoot amount in a change of the flow rate of the cathode gas becomes smaller as the acceptable overshoot level gets lower, and perform control of the pressure regulation valve. This configuration suppresses an excessive overshoot in the flow rate of the cathode gas.

(2) The fuel cell system according to the above aspect; wherein in the (b), the controller may be configured: (i) when the acceptable overshoot level is a highest level among the plurality of levels, to maintain the opening position of the pressure regulation valve at a larger opening position than the target opening position for a predetermined time period, subsequently decrease the opening position of the pressure regulation valve to the target opening position and maintain the opening position of the pressure regulation valve at the target opening position; and (ii) when the acceptable overshoot level is a lowest level among the plurality of levels, to decrease the opening position of the pressure regulation valve to a small opening position that is smaller than the target opening position, maintain the opening position of the pressure regulation valve at the small opening position for a predetermined time period, subsequently increase the opening position of the pressure regulation valve to the target opening position and maintain the opening position of the pressure regulation valve at the target opening position.

When the highest level is determined as the acceptable overshoot level, the fuel cell system of this aspect maintains the opening position of the pressure regulation valve at the larger opening position than the target opening position for the predetermined time period, subsequently decreases the opening position of the pressure regulation valve to the target opening position and maintains the opening position of the pressure regulation valve at the target opening position. This configuration increases the supply rate of the cathode gas and thereby rapidly increases the amount of power generation by the fuel cell stack. When the lowest level is determined as the acceptable overshoot level, on the other hand, the fuel cell system of this aspect decreases the opening position of the pressure regulation valve to the small opening position that is smaller than the target opening position, maintains the opening position of the pressure regulation valve at the small opening position for the predetermined time period, subsequently increases the opening position of the pressure regulation valve to the target opening position and maintains the opening position of the pressure regulation valve at the target opening position. This configuration accelerates a rise of the pressure of the cathode gas in the middle of a transient change of the flow rate of the cathode gas and thereby suppresses an overshoot in the flow rate of the cathode gas.

(3) The fuel cell system according to the above aspect; wherein the larger opening position than the target opening position in the (i) may be an intermediate opening position that is smaller than an opening position prior to a start of the control of the pressure regulation valve in the (b) and may be larger than the target opening position.

The fuel cell system of this aspect maintains the opening position of the pressure regulation valve at the intermediate opening position that is smaller than the opening position prior to the start of the control of the pressure regulation valve and is larger than the target opening position for the predetermined time period in the (i). This configuration suppresses an excessive overshoot even when the highest level is determined as the acceptable overshoot level.

(4) The fuel cell system according to the above aspect; may further comprise: an impedance sensor configured to measure an impedance of the fuel cell stack, wherein when the impedance obtained from the impedance sensor is higher than a predetermined value, the controller sets the acceptable overshoot level to the lowest level.

When the impedance is higher than a predetermined value, it is determined that the fuel cell stack is in the dry state. When the impedance is higher than the predetermined value, the fuel cell system of this aspect sets the lowest level as the acceptable overshoot level, irrespective of the increased amount of the required power output. This decreases the overshoot amount and suppresses the fuel cell stack from being excessively dried.

(5) The fuel cell system according to the above aspect; may further comprising: a temperature sensor configured to measure a temperature of cooling water in the fuel cell stack, wherein when the temperature of cooling water obtained from the temperature sensor is higher than a predetermined value, the controller sets the acceptable overshoot level to the lowest level.

When the temperature of cooling water is higher than a predetermined value, it is determined that the fuel cell stack is likely to dry. When the temperature of cooling water is higher than the predetermined value, the fuel cell system of this aspect sets the lowest level as the acceptable overshoot level, irrespective of the increased amount of the required power output. This decreases the overshoot amount and suppresses the fuel cell stack from being excessively dried.

The disclosure may be implemented by any of various aspects other than the fuel cell system, for example, a moving body with the fuel cell system mounted thereon and a control method of the fuel cell system.

DESCRIPTION OF EMBODIMENTS

First Embodiment

Figure 1:
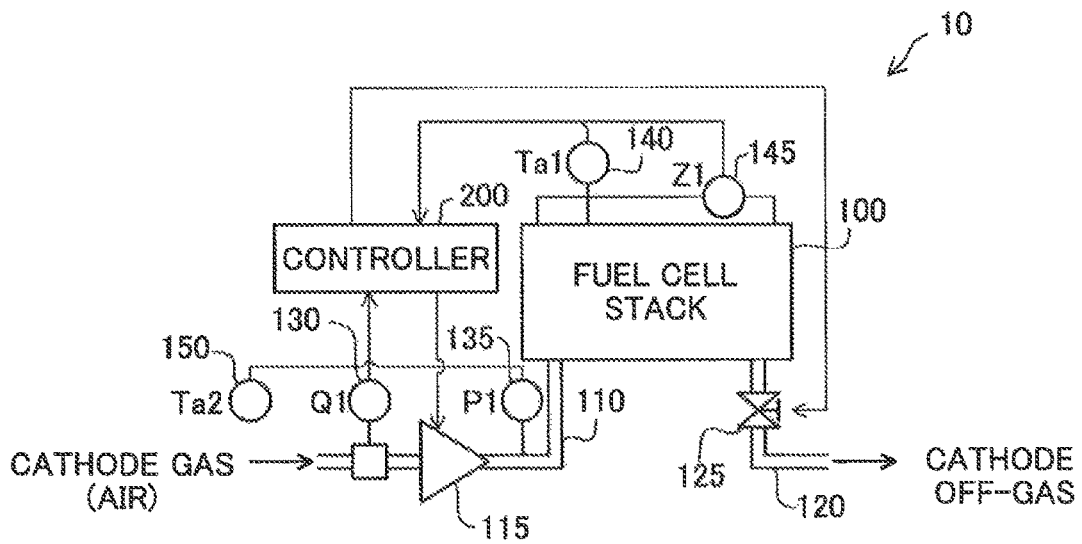
FIG. 1 is a diagram schematically illustrating a cathode gas system in a fuel cell system.

FIG. 1 is a diagram schematically illustrating a cathode gas system in a fuel cell system 10. The fuel cell system 10 is mounted on a moving body, such as a vehicle. The fuel cell system 10 may include a fuel cell stack 100, a cathode gas supply line 110, a cathode off-gas line 120, a turbo-type compressor 115 (hereinafter called "turbo compressor 115"), a pressure regulation valve 125, a flowmeter 130, a pressure sensor 135, a temperature sensor 140 and an impedance sensor 145 for the fuel cell stack 100, an ambient temperature sensor 150 and a controller 200. The turbo compressor 115 is provided in the cathode gas supply line 110 and is configured to supply the air as a cathode gas through the cathode gas supply line 110 to the fuel cell stack 100. The pressure regulation valve 125 is provided in the cathode off-gas line 120 and is configured to regulate the pressure of the cathode gas in the fuel cell stack 100. The flowmeter 130 is configured to measure flow rate Q1 of the cathode gas that is to be supplied to the fuel cell stack 100. The pressure sensor 135 is configured to measure pressure P1 of the cathode gas on an outlet side of the turbo compressor 115 (i.e., on an inlet side of the fuel cell stack 100). The temperature sensor 140 is configured to measure temperature Ta1 of cooling water for the fuel cell stack 100. This temperature sensor 140 may be placed, for example, on an outlet side of the fuel cell stack 100 in a cooling water line (not shown) of the fuel cell stack 100. This temperature Ta1 of cooling water is substantially equal to the temperature of the fuel cell stack 100. The impedance sensor 145 is configured to measure impedance Z1 of the fuel cell stack 100. The impedance Z1 and the temperature Ta1 of cooling water are used to identify whether the fuel cell stack 100 is in the dry state or in the wet state. The ambient temperature sensor 150 is configured to measure ambient temperature Ta2.

The controller 200 calculates a required value of electric power (required power output) that is to be generated by the fuel cell stack 100, based on the condition of the moving body (for example, the speed) and the driver's operation. The controller 200 controls the operations of the turbo compressor 115 and the pressure regulation valve 125, based on the required power output of the fuel cell stack 100. This control will be described later in detail.

Figure 2:
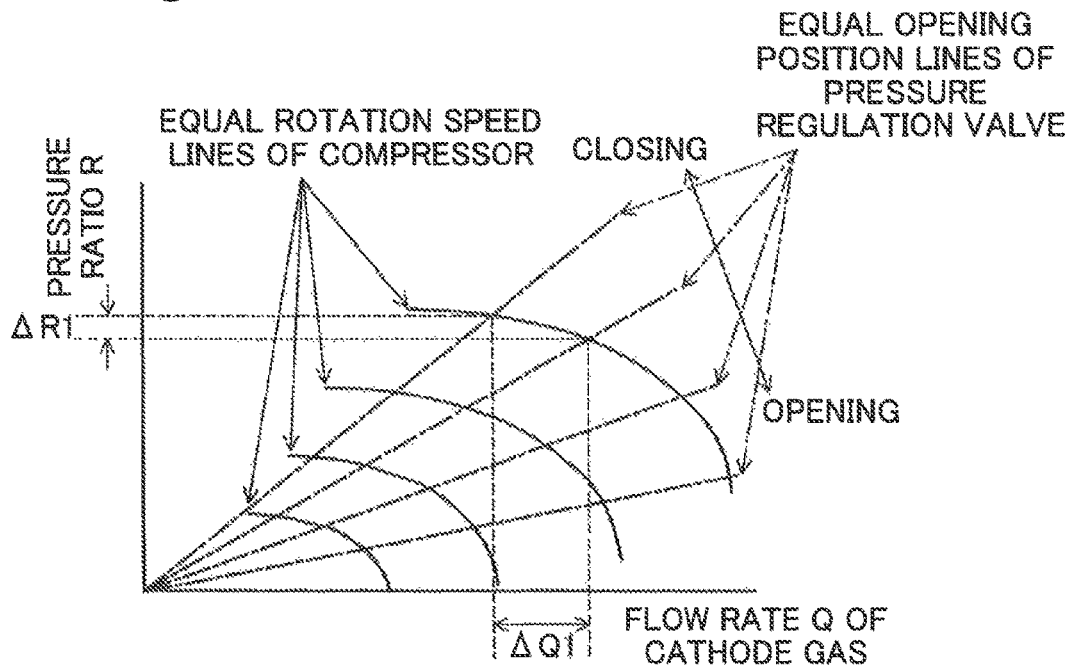
FIG. 2 is a graph showing a relationship between pressure ratio of the turbo compressor and flow rate of the cathode gas.

FIG. 2 is a graph showing a relationship between pressure ratio R of the turbo compressor 115 (i.e., pressure at an outlet of the turbo compressor 115/pressure at an inlet of the turbo compressor 115) and flow rate Q of the cathode gas. The turbo compressor 115 has a varying value $\Delta Q1/\Delta R1$ according to the magnitude of the pressure ratio R and provides different flow rates of the cathode gas at different pressure ratios even when the rotation speed of the turbo compressor 115 is fixed. In other words, the flow rate of the cathode gas is not determined by simply determining the rotation speed of the turbo compressor 115 but is determined by the combination of the rotation speed of the turbo compressor 115 and the opening position of the pressure regulation valve 125. In the graph of FIG. 2, when the pressure at the inlet of the turbo compressor 115 is the atmospheric pressure (approximately 1 atm), the value of the pressure ratio R expressed in the unit of [atm] is approximately equal to the value of the pressure at the outlet of the turbo compressor 115. In general, the pressure at an inlet of a compressor is the atmospheric pressure. In the graph of FIG. 2, the ordinate axis may be a pressure expressed in the unit of [atm], in place of the pressure ratio.

Figure 3:
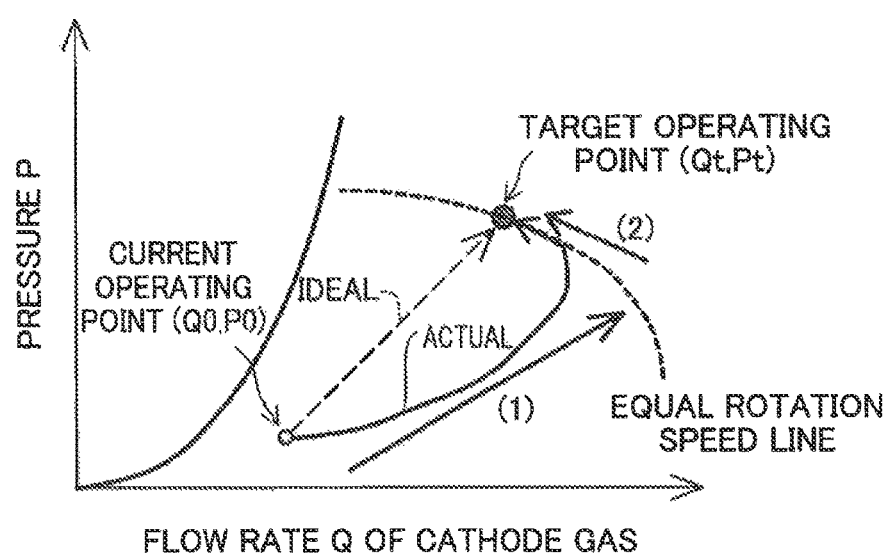
FIG. 3 is a graph showing an example of a change in pressure of the cathode gas against flow rate of the cathode gas from a current operating point to a target operating point of the turbo compressor.

FIG. 3 is a graph showing an example of a change in pressure P of the cathode gas against flow rate Q of the cathode gas from a current operating point (Q0,P0) to a target operating point (Qt,Pt) of the turbo compressor 115. FIG. 3 corresponds the graph of FIG. 2 with the pressure P as the ordinate axis when the pressure at the inlet of the turbo compressor 115 is 1 atm.

In the ideal state, the flow rate-pressure relationship linearly changes from the current operating point (Q0,P0) to the target operating point (Qt,Pt). In the actual state, however, the relationship changes as described below from the current operating point (Q0,P0) to the target operating point (Qt,Pt):

(1) The controller 200 decreases the opening position of the pressure regulation valve 125 and increases the rotation speed of the turbo compressor 115 in order to increase the flow rate of the cathode gas. This results in increasing both the pressure P of the cathode gas and the flow rate Q of the cathode gas. In this state, the flow rate of the cathode gas slightly exceeds a target flow rate and falls into an overshoot state.

(2) The pressure of the cathode gas is then accumulated to increase, and the flow rate decreases from the overshoot state. The flow rate-pressure relationship then eventually reaches the target operating point (Qt,Pt).

As described above, when the controller 200 increases the flow rate of the cathode gas, the actual procedure once increases the flow rate Q of the cathode gas to the overshoot state and then causes the flow rate Q of the cathode gas and the pressure P of the cathode gas to reach the target operating point (Qt,Pt). A significantly large overshoot amount of the flow rate of the cathode gas is likely to excessively dry the cathode of the fuel cell stack 100. Accordingly, a small overshoot amount is generally desirable. In response to a certain change of the required power output, however, there may be a need for rapidly supplying the cathode gas and rapidly increasing the amount of power generation by the fuel cell stack 100, even when the flow rate of the cathode gas is allowed to have a large overshoot amount. The controller 200 accordingly determines an acceptable overshoot level of the flow rate of the cathode gas according to the operating condition of the fuel cell system 10 and controls the opening position of the pressure regulation valve 125 based on the determined acceptable overshoot level.

Figure 4:
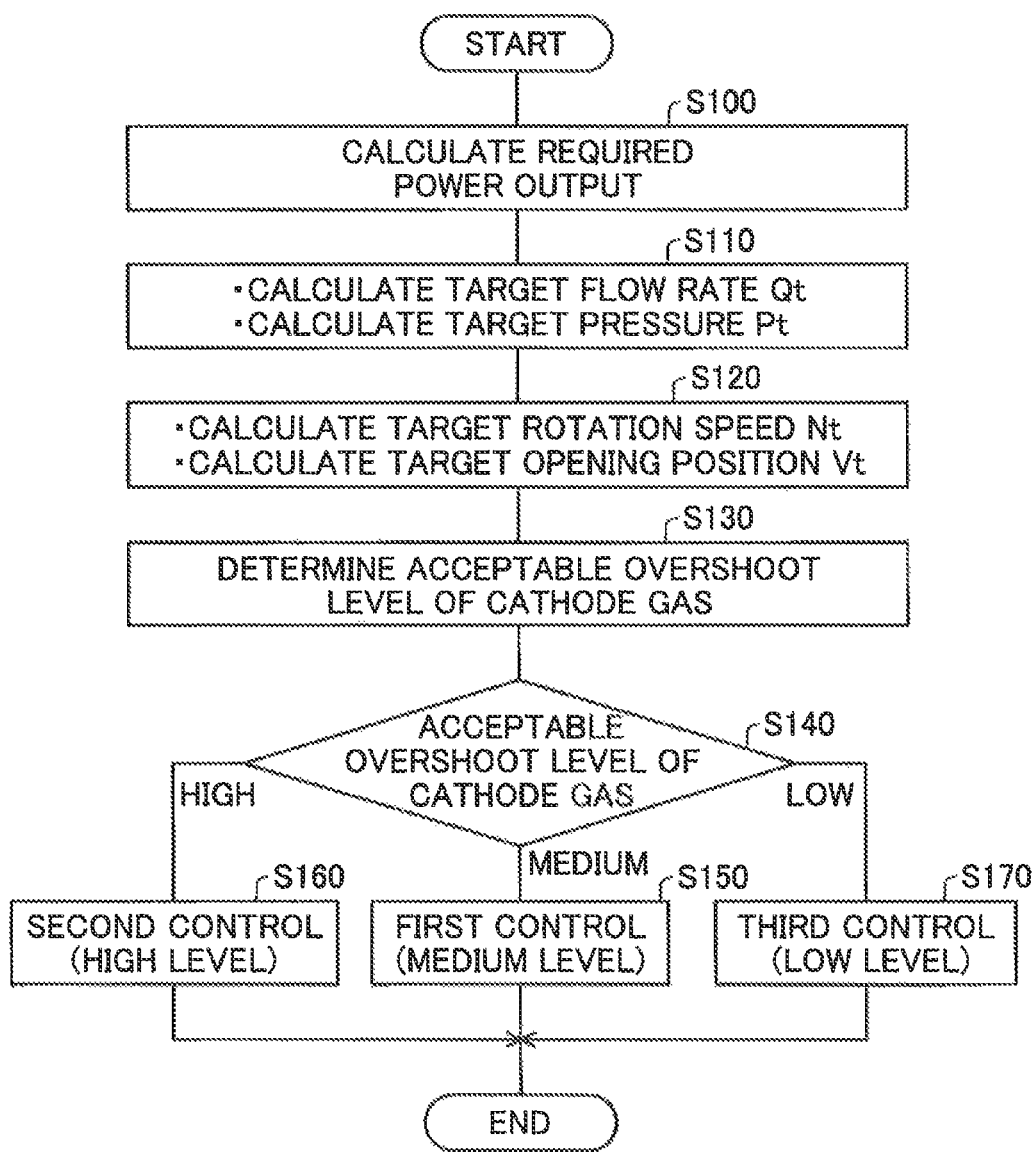
FIG. 4 is a control flowchart according to this embodiment.

FIG. 4 is a control flowchart according to this embodiment. At step S100, the controller 200 calculates a required power output of the fuel cell stack 100, based on the speed of the moving body, the depression amount of an accelerator pedal and the depression amount of a brake pedal (relevant sensors are not shown).

At step S110, the controller 200 calculates a flow rate of the cathode gas to be supplied to the fuel cell stack 100 (target flow rate Qt) and a pressure of the cathode gas in the fuel cell stack 100 (target pressure Pt), based on the calculated required power output of the fuel cell stack 100, the temperature Ta1 of cooling water in the fuel cell stack 100 and the ambient temperature Ta2. An increase of the required power output increases the target flow rate Qt of the cathode gas. The relationship of the combination of the required power output, the temperature Ta1 of cooling water in the fuel cell stack 100 and the ambient temperature Ta2 to the target flow rate Qt and the target pressure Pt of the cathode gas may be determined in advance by experiment or the like and stored in the form of a map. According to another embodiment, the target flow rate Qt and the target pressure Pt of the cathode gas may be determined based on only the required power output without using the temperature Ta1 of cooling water in the fuel cell stack 100 and the ambient temperature Ta2.

At step S120, the controller 200 calculates a target rotation speed Nt of the turbo compressor 115 and a target opening position Vt of the pressure regulation valve 125 according to the relationship of FIG. 2, based on the calculated target flow rate Qt of the cathode gas and the calculated target pressure Pt of the cathode gas. The relationship of the combination of the flow rate Q of the cathode gas and the pressure ratio R of the turbo compressor 115 shown in FIG. 2 to the combination of the opening position of the pressure regulation valve 125 and the rotation speed of the turbo compressor 115 may be stored in the form of, for example, a map, a function or a lookup table, in advance in a non-volatile memory of the controller 200.

At step S130, the controller 200 determines an acceptable overshoot level of the cathode gas according to the increased amount of the required power output of the fuel cell stack 100, among a plurality of levels. As described above with reference to FIG. 3, when the controller 200 increases the rotation speed of the turbo compressor 115 to increase the flow rate Q of the cathode gas, the flow rate Q of the cathode gas slightly exceeds the target flow rate Qt. An excess amount (=Q−Qt) from the target flow rate Qt is an overshoot amount. The controller 200 determines the acceptable overshoot level that denotes the degree of acceptable overshoot amount. A plurality of levels may be set in advance as the acceptable overshoot level. According to this embodiment, three levels are used as the acceptable overshoot level. The larger acceptable overshoot amount provides the higher acceptable overshoot level. In general, a large increased amount of the required power output of the fuel cell stack 100 provides a high acceptable overshoot level, and a small increased amount of the required power output provides a low acceptable overshoot level. Accordingly the acceptable overshoot level increases with an increase in the increased amount of the required power output. This may be attributed to the following reason. The large increased amount of the required power output generally needs to quickly output a high electric current from the fuel cell stack 100. Accordingly there is generally a need for rapidly increasing the amount of power generation by the fuel cell stack 100, while the flow rate Q of the cathode gas is allowed to have a large overshoot amount.

When the fuel cell stack 100 is in the dry state, however, it is desirable that the controller 200 sets the low acceptable overshoot level, irrespective of the increased amount of the required power output. This may be attributed to the following reason. An excessively large overshoot of the flow rate Q of the cathode gas in the dry state of the fuel cell stack 100 is likely to further increase the degree of dryness of the fuel cell stack 100 and cause a difficulty in power generation. The controller 200 may determine whether the fuel cell stack 100 is in the dry state (the dry state or the wet state of the fuel cell stack), based on the impedance Z1 of the fuel cell stack 100. When the impedance Z1 is higher than a predetermined value, the controller 200 determines that the fuel cell stack 100 is in the dry state and preferably sets the low acceptable overshoot level, irrespective of the increased amount of the required power output. According to another embodiment, the controller 200 may determine whether the fuel cell stack 100 is in the dry state, based on the temperature Ta1 of cooling water in the fuel cell stack 100, in place of the impedance Z1. In this latter embodiment, when the temperature Ta1 of cooling water in the fuel cell stack 100 is higher than a predetermined value, the controller 200 determines that the fuel cell stack 100 is likely to dry and preferably sets the low acceptable overshoot level, irrespective of the increased amount of the required power output.

At step S140, the controller 200 branches the processing flow according to the acceptable overshoot level as follows:

(i) performing first control (step S150) when the acceptable overshoot level is a medium level;

(ii) performing second control (step S160) when the acceptable overshoot level is a high level; and (iii) performing third control (step S170) when the acceptable overshoot level is a low level.

Figure 5:
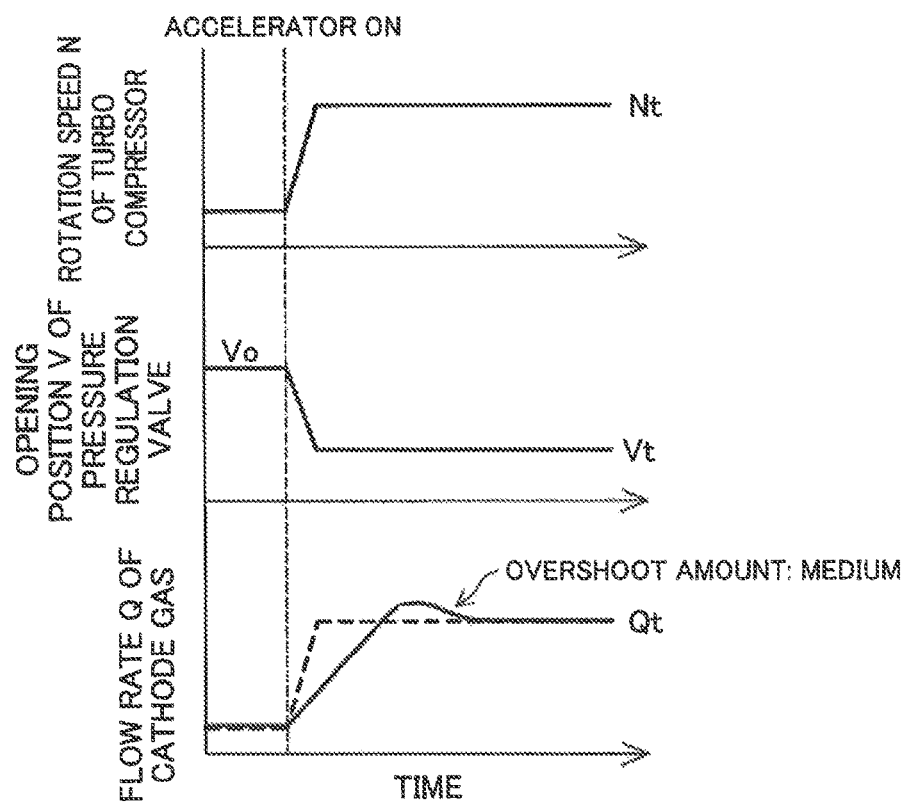
FIG. 5 is a graph showing changes in rotation speed of the turbo compressor, opening position of the pressure regulation valve and flow rate of the cathode gas in the first control.

FIG. 5 is a graph showing changes in rotation speed N of the turbo compressor 115, opening position V of the pressure regulation valve 125 and flow rate Q of the cathode gas in the first control. In the first control, the controller 200 increases the rotation speed N of the turbo compressor 115 to the target rotation speed Nt, while setting a time change in the opening position V of the pressure regulation valve 125 such as to decrease the opening position V of the pressure regulation valve 125 from an opening position Vo prior to a start of the first control to the target opening position Vt and subsequently maintain the opening position V of the pressure regulation valve 125 at the target opening position Vt. This provides a medium overshoot a mount of the flow rate Q of the cathode gas. When the opening position of the pressure regulation valve 125 is to be changed, it is preferable to change the opening position at a fixed rate (the same applies to FIGS. 6 and 7).

Figure 6:
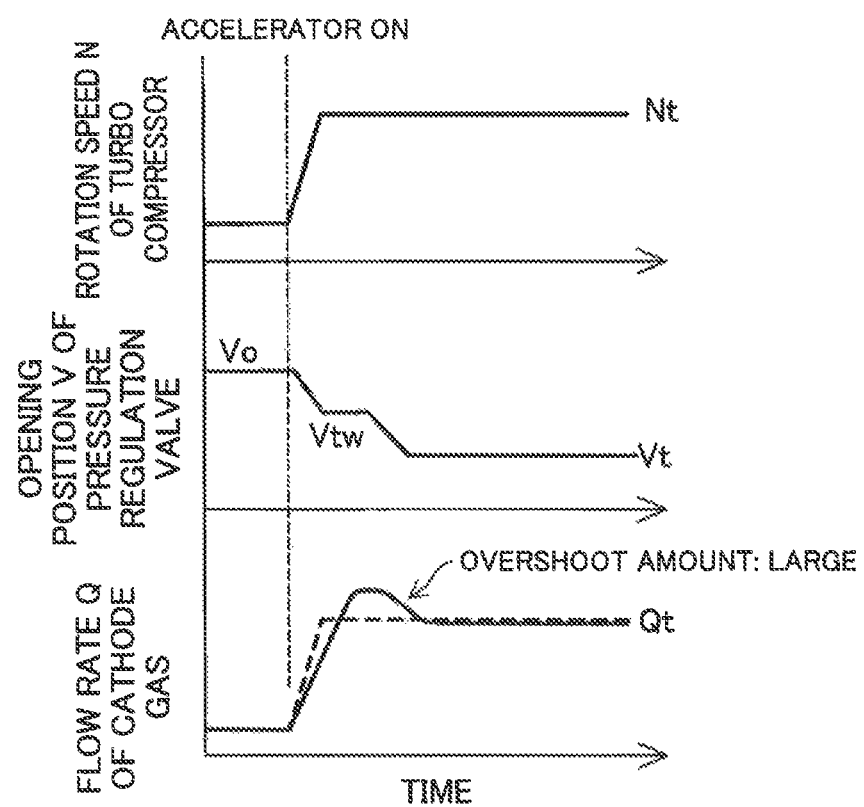
FIG. 6 is a graph showing changes in rotation speed of the turbo compressor, opening position of the pressure regulation valve and flow rate of the cathode gas in the second control.

FIG. 6 is a graph showing changes in rotation speed N of the turbo compressor 115, opening position V of the pressure regulation valve 125 and flow rate Q of the cathode gas in the second control. In the second control, the controller 200 increases the rotation speed N of the turbo compressor 115 to the target rotation speed Nt, while setting a time change in the opening position V of the pressure regulation valve 125 such as to decrease the opening position V of the pressure regulation valve 125 from an opening position Vo prior to a start of the second control to an intermediate opening position Vtw that is larger than the target opening position Vt, maintain the opening position V of the pressure regulation valve 125 at the intermediate opening position Vtw for a predetermined time period, subsequently decrease the opening position V of the pressure regulation valve 125 to the target opening position Vt and maintain the opening position V of the pressure regulation valve 125 at the target opening position Vt. In this case, the opening position V of the pressure regulation valve 125 is maintained at the intermediate opening position Vtw for the predetermined time period. This provides a larger overshoot amount of the flow rate Q of the cathode gas than the overshoot amount in the first control (shown in FIG. 5). The time period when the opening position V of the pressure regulation valve 125 is to be maintained at the intermediate opening position Vtw may be a time period determined according to the increased amount of the required power output of the fuel cell stack 100 and the amount of change in the opening position V of the pressure regulation valve 125. When the opening position V of the pressure regulation valve 125 is subsequently decreased to the target opening position Vt, the flow rate Q of the cathode gas decreases toward the target flow rate Qt. In the second control, the controller 200 increases the supply rate of the cathode gas to the fuel cell stack 100 while accepting a large overshoot of the flow rate Q of the cathode gas. This configuration rapidly increases the amount of power generation by the fuel cell stack 100.

Figures 7, 8:
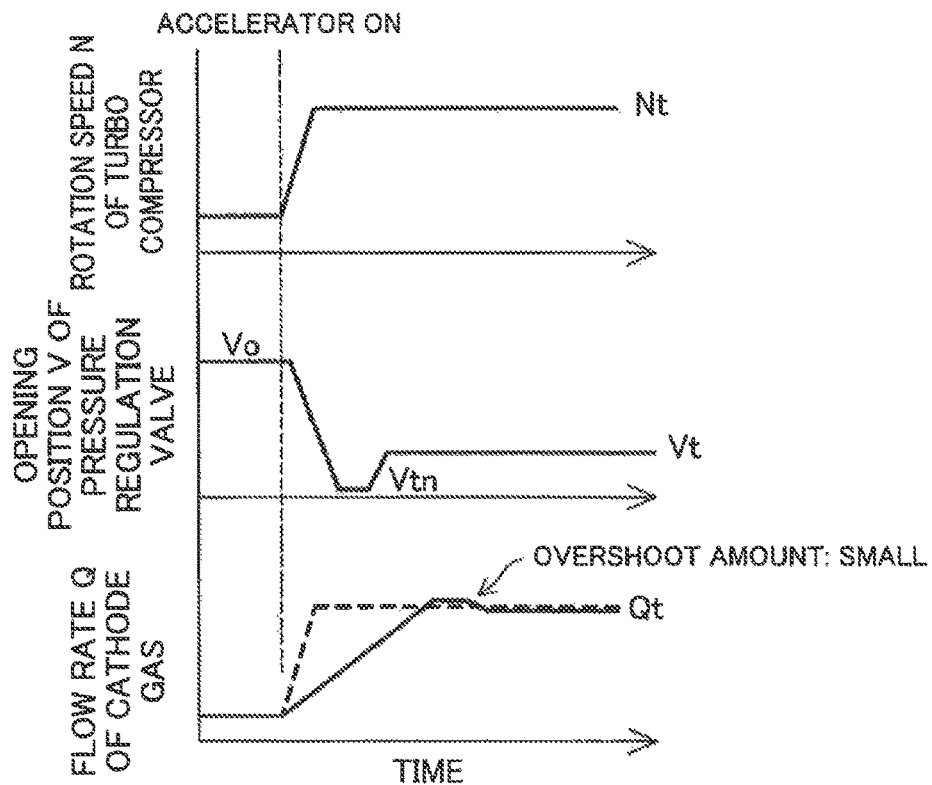
FIG. 7 is a graph showing changes in rotation speed of the turbo compressor, opening position of the pressure regulation valve and flow rate of the cathode gas in the third control.
FIG. 8 is a table summarizing the responses of the flow rate of the cathode gas, the responses of the pressure of the cathode gas and the overshoot amounts of the cathode gas with respect to the first control, the second control and the third control.

FIG. 7 is a graph showing changes in rotation speed N of the turbo compressor 115, opening position V of the pressure regulation valve 125 and flow rate Q of the cathode gas in the third control. In the third control, the controller 200 increases the rotation speed N of the turbo compressor 115 to the target rotation speed Nt, while setting a time change in the opening position V of the pressure regulation valve 125 such as to decrease the opening position V of the pressure regulation valve 125 from an opening position Vo prior to a start of the third control to a small opening position Vtn that is smaller than the target opening position Vt, maintain the opening position V of the pressure regulation valve 125 at the small opening position Vtn for a predetermined time period, subsequently increase the opening position V of the pressure regulation valve 125 to the target opening position Vt and maintain the opening position V of the pressure regulation valve 125 at the target opening position Vt. The time period when the opening position V of the pressure regulation valve 125 is to be maintained at the small opening position Vtn may be, for example, a time period set in advance or may be a time period until the measured flow rate Q of the cathode gas reaches a predetermined flow rate (for example, target flow rate Qt). In the third control, the controller 200 decreases the opening position V of the pressure regulation valve 125 to the small opening position Vtn that is smaller than the target opening position Vt in the middle of a transient change of the flow rate Q of the cathode gas. This configuration accelerates a rise of the pressure P of the cathode gas in the fuel cell stack 100 and provides a small overshoot amount of the flow rate Q of the cathode gas. This also suppresses the fuel cell stack 100 from being excessively dried.

FIG. 8 is a table summarizing the responses of the flow rate of the cathode gas, the responses of the pressure of the cathode gas and the overshoot amounts of the cathode gas with respect to the first control, the second control and the third control. More specifically, the table of FIG. 8 shows the responses of the flow rate of the cathode gas, the responses of the pressure of the cathode gas and the overshoot amounts of the cathode gas with respect to the second control and the third control, in comparison with the response of the flow rate, the response of the pressure and the overshoot amount with respect to the first control that are assumed to be standards. The second control provides the quicker response of the flow rate of the cathode gas and the larger overshoot amount of the cathode gas but the slower response of the pressure of the cathode gas, compared with the first control. The third control, on the other hand, provides the slower response of the flow rate of the cathode gas but the quicker response of the pressure of the cathode gas and the smaller overshoot amount of the cathode gas, compared with the first control.

Figure 9:
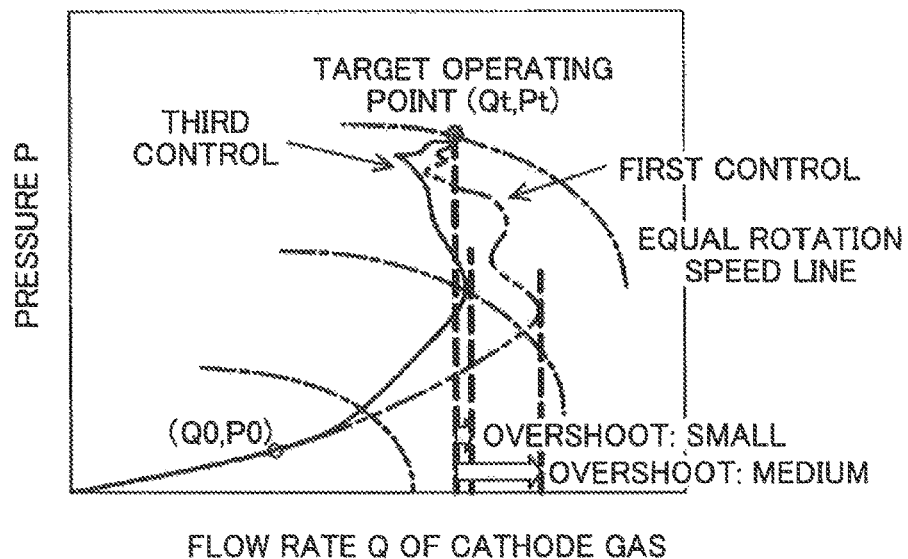
FIG. 9 is a diagram illustrating comparison between the trajectory of the opening point with respect to the first control and the trajectory of the opening point with respect to the third control.

FIG. 9 is a diagram illustrating comparison between the trajectory of the opening point with respect to the first control and the trajectory of the opening point with respect to the third control. The first control sets a time change in the opening position V of the pressure regulation valve 125 such as to set the target opening position Vt to the command value of the opening position V of the pressure regulation valve 125. This provides a slower rise of the pressure P of the cathode gas, makes the flow rate Q of the cathode gas likely to have an overshoot and provides a relatively large overshoot amount. The trajectory of the opening point with respect to the second control is omitted from the illustration, but the second control provides a larger overshoot amount than that of the first control. The third control, on the other hand, sets a time change in the opening position V of the pressure regulation valve 125 such as to first set the small opening position Vtn and then set the target opening position Vt to the command value of the opening position V of the pressure regulation valve 125. This provides a quicker rise of the pressure P of the cathode gas, makes the flow rate Q of the cathode gas unlikely to have an overshoot and provides a small overshoot amount.

As described above, according to this embodiment, the controller 200 determines the acceptable overshoot level of the flow rate Q of the cathode gas according to the increased amount of the required power output of the fuel cell stack 100 and sets the time change in the opening position V of the pressure regulation valve 125 according to the determined acceptable overshoot level. This facilitates controls, for example, improvement of the response of power generation by the fuel cell stack and suppression of an overshoot of the flow rate of the cathode gas.

Second Embodiment

Figure 10:
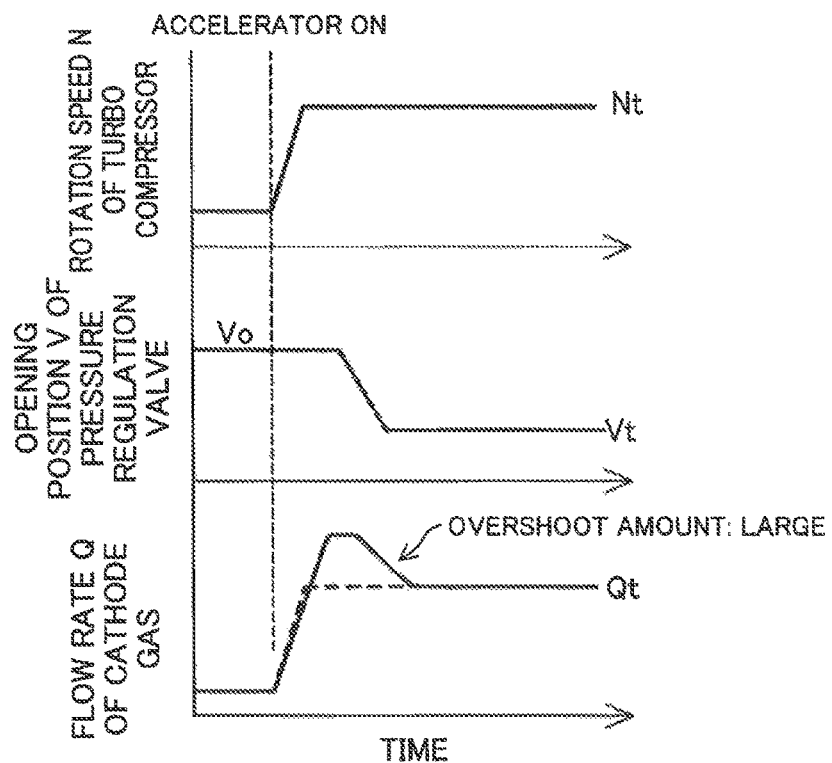
FIG. 10 is a graph showing changes in rotation speed of the turbo compressor, opening position of the pressure regulation valve and flow rate of the cathode gas in a second control according to a second embodiment.

FIG. 10 is a graph showing changes in rotation speed N of the turbo compressor 115, opening position V of the pressure regulation valve 125 and flow rate Q of the cathode gas in a second control according to a second embodiment. The second embodiment has a similar system configuration and a similar processing procedure to those of the first embodiment and differs from the first embodiment only by a time change in the opening position V of the pressure regulation valve 125 in the second control. In the second control of the first embodiment (shown in FIG. 6), the controller 200 sets the time change in the opening position V of the pressure regulation valve 125 such as to decrease the opening position V of the pressure regulation valve 125 to the intermediate opening position Vtw that is smaller than the opening position Vo prior to a start of the second control and is larger than the target opening position Vt. In the second control of the second embodiment, on the other hand, the controller 200 sets a time change in the opening position V of the pressure regulation valve 125 such as to maintain the opening position V of the pressure regulation valve 125 at the opening position Vo prior to a start of the second control for a predetermined time period, subsequently decrease the opening position V of the pressure regulation valve 125 to the target opening position Vt and maintain the opening position V of the pressure regulation valve 125 at the target opening position Vt. According to another embodiment, a time change in the opening position V of the pressure regulation valve 125 may be set such as to maintain the opening position V of the pressure regulation valve 125 at a larger opening position than the opening position Vo prior to a start of the second control for a predetermined time period, subsequently decrease the opening position V of the pressure regulation valve 125 to the target opening position Vt and maintain the opening position V of the pressure regulation valve 125 at the target opening position Vt. As clearly understood from the description of the first embodiment and the second embodiment, in the second control, the controller 200 may maintain the opening position V of the pressure regulation valve 125 at a larger opening position than the target opening position Vt for a predetermined time period, subsequently decrease the opening position V of the pressure regulation valve 125 to the target opening position Vt and maintain the opening position V of the pressure regulation valve 125 at the target opening position Vt. This configuration accelerates a rise of the pressure P of the cathode gas in the middle of a transient change of the flow rate of the cathode gas and thereby suppresses an overshoot of the flow rate of the cathode gas. The controller 200, as shown in the second control of the first embodiment (shown in FIG. 6), set to maintain the opening position V of the pressure regulation valve 125 at the intermediate opening position Vtw that is smaller than the opening position Vo prior to the start of the second control and is larger than the target opening position Vt for a predetermined time period, subsequently decrease the opening position V of the pressure regulation valve 125 to the target opening position Vt and maintain the opening position V at the target opening position Vt is, however, preferable in the term of suppressing an excessive overshoot even at the highest acceptable overshoot level.

Modification 1

In the embodiment described above, the controller 200 determines the acceptable overshoot level, based on the increased amount of the required power output of the fuel cell stack 100 and the impedance Z1 or the temperature Ta1 of cooling water (degree of dryness). According to a modification, the acceptable overshoot level may be determined, based on the required power output without taking into account the impedance Z1 or the temperature Ta1 of cooling water. According to another modification, the acceptable overshoot level may be determined by taking into account another parameter (for example, an increased amount of the flow rate of the cathode gas), in addition to the required power output and the impedance Z1 or the temperature Ta1 of cooling water.

Modification 2

In the embodiment described above, three levels are set in advance as options of the acceptable overshoot level. The number of levels is, however, not limited to this embodiment but may be any number of not less than two. The time changes in the opening position V of the pressure regulation valve 125 with respect to the respective levels are not limited to those described above as the first control to the third control but may be various other time changes that are respectively set experimentally or empirically. Under the condition that the flow rate of the cathode gas before an increase of the flow rate (i.e., initial flow rate) is equal to the flow rate of the cathode gas after the increase of the flow rate (target flow rate), the time changes in the opening position V of the pressure regulation valve 125 with respect to the respective levels should be set such as to provide a larger overshoot amount of the flow rate of the cathode gas with respect to a higher level. At the highest level among the plurality of levels, however, the time change in the opening position V of the pressure regulation valve 125 is preferably set to maintain the opening position V of the pressure regulation valve 125 at a larger opening position than the target opening position Vt and subsequently decrease the opening position V of the pressure regulation valve 125 to the target opening position Vt, like the second control described above (as shown in FIG. 6 or FIG. 10). At the lowest level, on the other hand, the time change in the opening position V of the pressure regulation valve 125 is preferably set to decrease the opening position V of the pressure regulation valve 125 to the small opening position Vtn, maintain the opening position V of the pressure regulation valve 125 at the small opening position Vtn and subsequently increase the opening position V to the target opening position Vt, like the third control described above (as shown in FIG. 7).

Modification 3

In the embodiment described above, the intermediate opening position Vtw of the second control may be increased with an increase in the increased amount of the required power output, and the small opening position Vtn of the third control may be decreased with a decrease in the increased amount of the required power output.

The foregoing describes some aspects of the disclosure with reference to some embodiments. The embodiments of the disclosure described above are provided only for the purpose of facilitating the understanding of the disclosure and not for the purpose of limiting the disclosure in any sense. The disclosure may be changed, modified and altered without departing from the scope of the disclosure and includes equivalents thereof.

What is claimed is:

1. A fuel cell system, comprising:
a fuel cell stack;
a turbo compressor configured to supply a cathode gas to the fuel cell stack through a cathode gas supply line;
a pressure regulation valve configured to regulate a pressure of the cathode gas; and
a controller, wherein
the controller is configured to calculate a target rotation speed of the turbo compressor and a target opening position of the pressure regulation valve, based on a target flow rate of the cathode gas and a target pressure of the cathode gas that are determined according to a required power output of the fuel cell stack and to control the turbo compressor and the pressure regulation valve using the calculated target rotation speed and the calculated target opening position, and
the controller is configured, upon increase of the required power output, to:
(a) determine an acceptable overshoot level of a flow rate of the cathode gas that is to be supplied to the fuel cell stack, the acceptable overshoot level being selected from a plurality of levels based on at least an increased amount of the required power output; and
(b) set a time change in opening position of the pressure regulation valve such that an overshoot amount in a change of the flow rate of the cathode gas becomes smaller as the acceptable overshoot level gets lower, and perform control of the pressure regulation valve.

2. The fuel cell system according to claim 1, wherein the acceptable overshoot level represents a difference between the target flow rate of the cathode gas and a maximum cathode gas flow rate associated with the increase of the required power output.

3. The fuel cell system according to claim 1,
wherein in the (b), the controller is configured:
(i) when the acceptable overshoot level is a highest level among the plurality of levels, to maintain the opening position of the pressure regulation valve at a larger opening position than the target opening position for a predetermined time period, subsequently decrease the opening position of the pressure regulation valve to the target opening position and maintain the opening position of the pressure regulation valve at the target opening position; and
(ii) when the acceptable overshoot level is a lowest level among the plurality of levels, to decrease the opening position of the pressure regulation valve to a small opening position that is smaller than the target opening position, maintain the opening position of the pressure regulation valve at the small opening position for a predetermined time period, subsequently increase the opening position of the pressure regulation valve to the target opening position and maintain the opening position of the pressure regulation valve at the target opening position.

4. The fuel cell system according to claim 3, further comprising:
an impedance sensor configured to measure an impedance of the fuel cell stack, wherein
when the impedance obtained from the impedance sensor is higher than a predetermined value, the controller sets the acceptable overshoot level to the lowest level.

5. The fuel cell system according to claim 3, further comprising:
a temperature sensor configured to measure a temperature of cooling water in the fuel cell stack, wherein
when the temperature of cooling water is higher than a predetermined value, the controller sets the acceptable overshoot level to the lowest level.

6. The fuel cell system according to claim 3,
wherein the larger opening position than the target opening position in the (i) is an intermediate opening position that is smaller than an opening position prior to a start of the control of the pressure regulation valve in the (b) and is larger than the target opening position.

7. The fuel cell system according to claim 6, further comprising:
an impedance sensor configured to measure an impedance of the fuel cell stack, wherein
when the impedance obtained from the impedance sensor is higher than a predetermined value, the controller sets the acceptable overshoot level to the lowest level.

8. The fuel cell system according to claim 6, further comprising:
a temperature sensor configured to measure a temperature of cooling water in the fuel cell stack, wherein
when the temperature of cooling water is higher than a predetermined value, the controller sets the acceptable overshoot level to the lowest level.

9. A control method of a fuel cell system, the fuel cell system comprising:
a fuel cell stack;
a turbo compressor configured to supply a cathode gas to the fuel cell stack through a cathode gas supply line; and
a pressure regulation valve configured to regulate a pressure of the cathode gas,
the control method comprising the steps of:
calculating a target rotation speed of the turbo compressor and a target opening position of the pressure regulation valve, based on a target flow rate of the cathode gas and a target pressure of the cathode gas that are determined according to a required power output of the fuel cell stack; and controlling the turbo compressor and the pressure regulation valve using the calculated target rotation speed and the calculated target opening position; and the control method, upon increase of the required power output, comprising the steps of:
(a) determining an acceptable overshoot level of a flow rate of the cathode gas that is to be supplied to the fuel cell stack, the acceptable overshoot level being selected from a plurality of levels based on at least an increased amount of the required power output; and
(b) setting a time change in opening position of the pressure regulation valve such that an overshoot amount in a change of the flow rate of the cathode gas becomes smaller as the acceptable overshoot level gets lower and perform control of the pressure regulation valve.

10. The control method of the fuel cell system according to claim 9, wherein the acceptable overshoot level represents a difference between the target flow rate of the cathode gas and a maximum cathode gas flow rate associated with the increase of the required power output.

11. The control method of the fuel cell system according to claim 9, in the (b), the control method comprising the steps of:
(i) when the acceptable overshoot level is a highest level among the plurality of levels, maintaining the opening position of the pressure regulation valve at a larger opening position than the target opening position for a predetermined time period, subsequently decreasing the opening position of the pressure regulation valve to the target opening position and maintaining the opening position of the pressure regulation valve at the target opening position; and
(ii) when the acceptable overshoot level is a lowest level among the plurality of levels, decreasing the opening position of the pressure regulation valve to a small opening position that is smaller than the target opening position, maintain the opening position of the pressure regulation valve at the small opening position for a predetermined time period, subsequently increasing the opening position of the pressure regulation valve to the target opening position and maintain the opening position of the pressure regulation valve at the target opening position.

12. The control method of the fuel cell system according to claim 11,
wherein the larger opening position than the target opening position in the (i) is an intermediate opening position that is smaller than an opening position prior to a start of the control of the pressure regulation valve in the (b) and is larger than the target opening position.

13. The control method of the fuel cell system according to claim 11, the control method further comprising the steps of:
measuring an impedance of the fuel cell stack; and
when the measured impedance is higher than a predetermined value, setting the acceptable overshoot level to the lowest level.

14. The control method of the fuel cell system according to claim 12, the control method further comprising the steps of:
measuring an impedance of the fuel cell stack; and
when the measured impedance is higher than a predetermined value, setting the acceptable overshoot level to the lowest level.

15. The control method of the fuel cell system according to claim 11, the control method further comprising the steps of:
measuring a temperature of cooling water in the fuel cell stack; and
when the measured temperature of cooling water is higher than a predetermined value, setting the acceptable overshoot level to the lowest level.

16. The control method of the fuel cell system according to claim 12, the control method further comprising the steps of:
measuring a temperature of cooling water in the fuel cell stack; and
when the measured temperature of cooling water is higher than a predetermined value, setting the acceptable overshoot level to the lowest level.

* * * * *